United States Patent [19]

Miguel

[11] 4,247,239
[45] Jan. 27, 1981

[54] CARTON PALLETIZING DEVICE

[76] Inventor: Marvin E. Miguel, 15720 S. Henrici Rd.,, Oregon City, Oreg. 97045

[21] Appl. No.: 614,016

[22] Filed: Sep. 17, 1975

[51] Int. Cl.³ .................. B65G 57/32; A01D 87/12
[52] U.S. Cl. ...................................... 414/44; 198/518; 414/62; 414/101; 414/902
[58] Field of Search ............... 214/6 B, 6 P, 6 DK; 198/7 R, 7 BL, 9, 235, 347, 411, 412, 434, 518, 520, 313, 511, 594, 812, 402, 403; 414/44, 45, 82, 62, 101, 28, 902

[56] References Cited

U.S. PATENT DOCUMENTS

| | | | |
|---|---|---|---|
| 2,534,221 | 12/1950 | Borkmann | 198/402 |
| 2,597,220 | 5/1952 | Appel | 198/518 X |
| 2,609,115 | 9/1952 | Oklejas | 198/313 X |
| 2,997,187 | 8/1961 | Burt | 198/412 X |
| 3,143,222 | 8/1964 | Caskie | 414/82 X |
| 3,178,053 | 4/1965 | Robinson | 414/101 |
| 3,193,113 | 7/1965 | Kerr | 414/754 X |
| 3,225,684 | 12/1965 | Smith | 198/343 X |
| 3,245,557 | 4/1966 | Maramonte et al. | 214/6 P |
| 3,411,638 | 11/1968 | Dryon | 214/6 DK |
| 3,497,085 | 2/1970 | Jay et al. | 214/6 B |
| 3,521,736 | 7/1970 | Von Gal, Jr. et al. | 214/6 P X |
| 3,522,890 | 8/1970 | Birchall | 414/45 X |
| 3,596,777 | 8/1971 | Neely, Jr. | 214/6 B |
| 3,779,363 | 12/1973 | Elson et al. | 214/6 P X |
| 3,877,584 | 4/1975 | Holcombe | 214/6 B |
| 3,941,048 | 3/1976 | Oe et al. | 100/215 |

*Primary Examiner*—L. J. Paperner
*Attorney, Agent, or Firm*—Huebner & Worrel

[57] ABSTRACT

Disclosed is a mobile apparatus for picking up produce cartons from the field and stacking these cartons on pallets for further handling. The apparatus includes a forwardly projecting elevator which picks up cartons from the field and transfers them to a stacking mechanism where the cartons are stacked in cross-tied tiers on pallets. A transfer device permits pallets loaded with cartons to be moved rearwardly and off-loaded to trailers.

11 Claims, 24 Drawing Figures

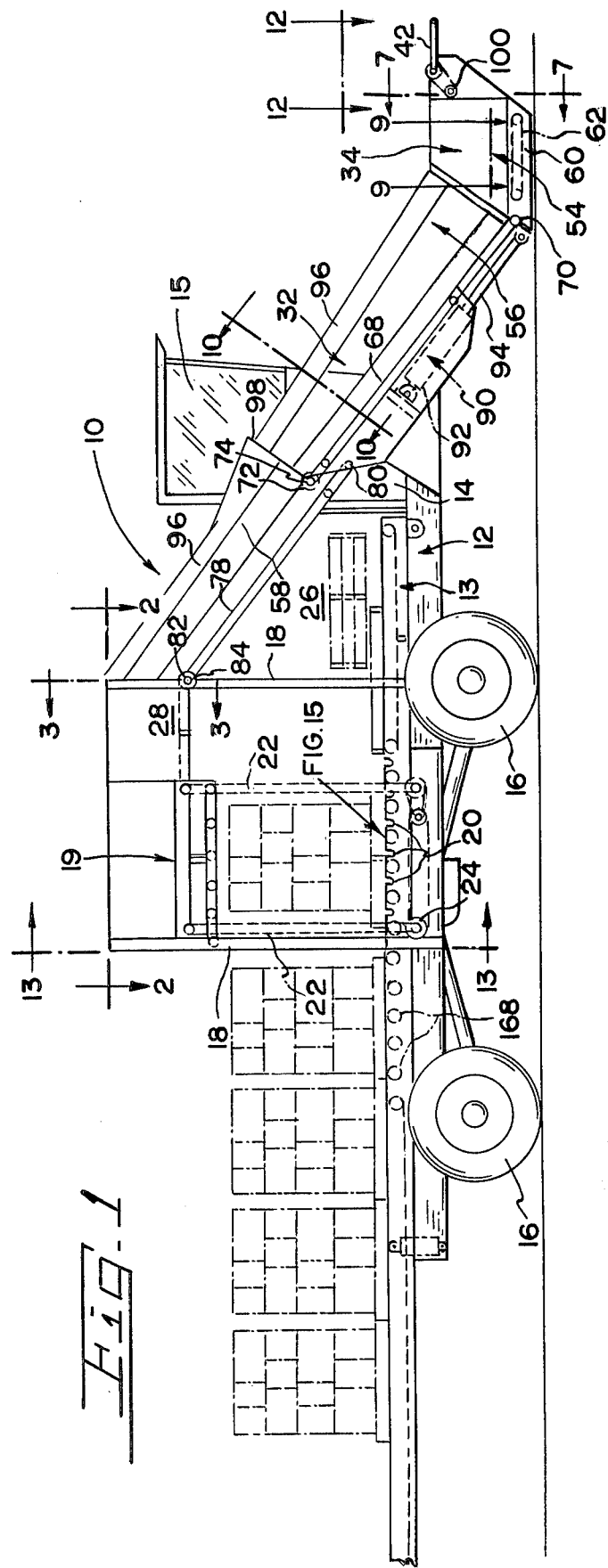

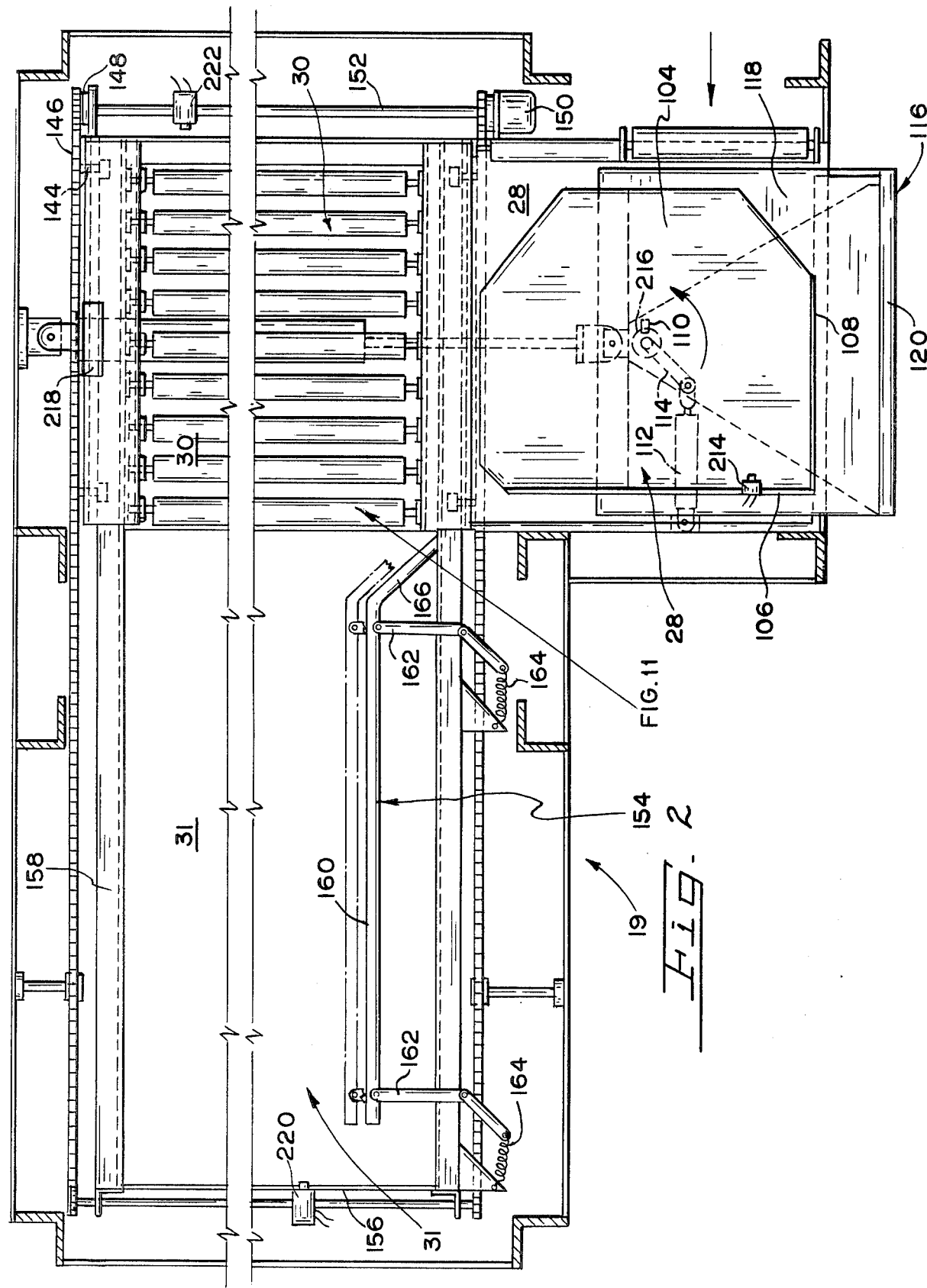

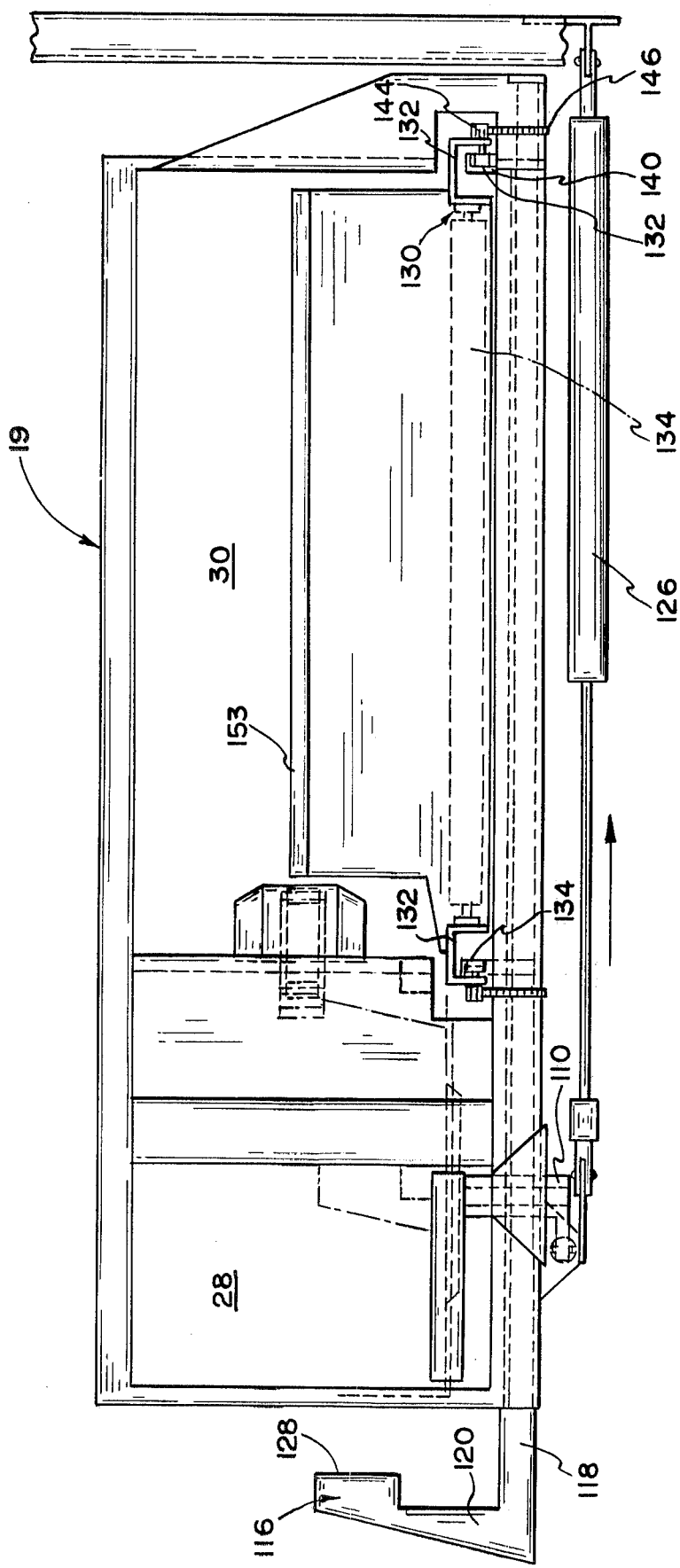

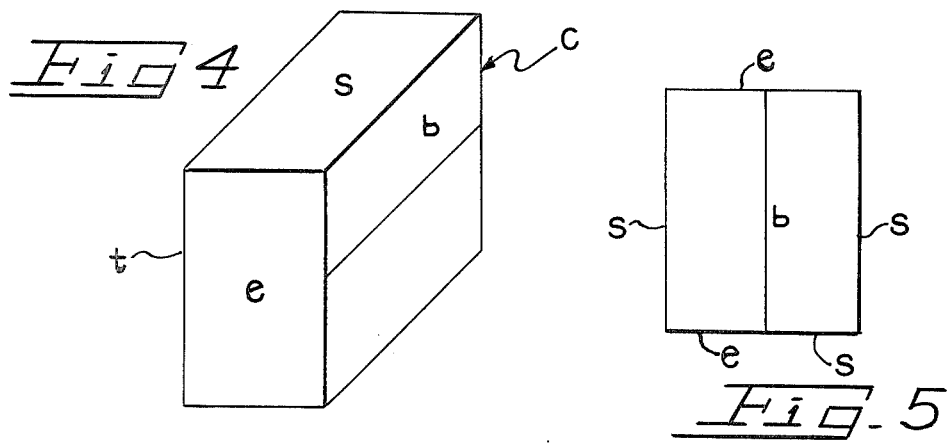
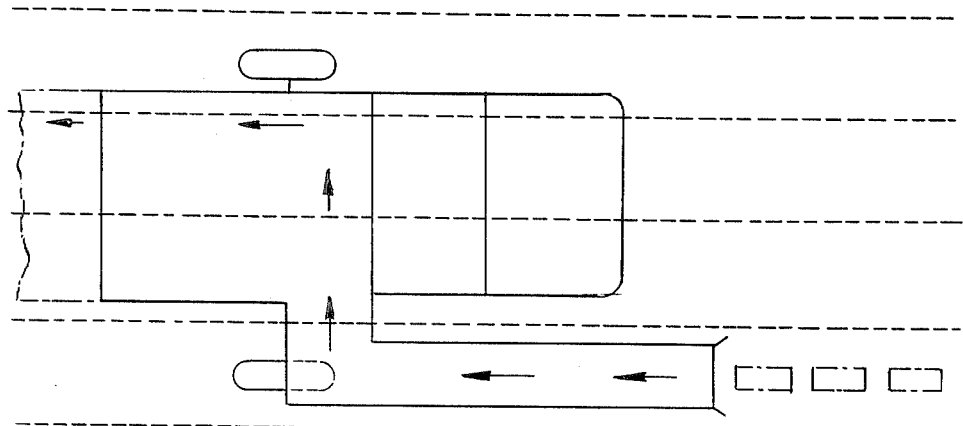
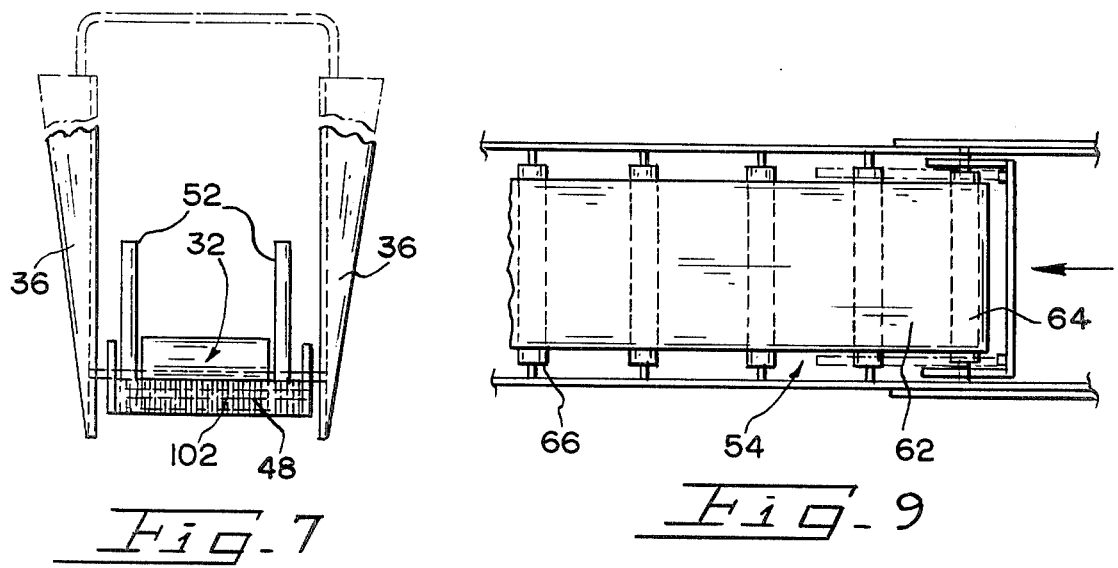

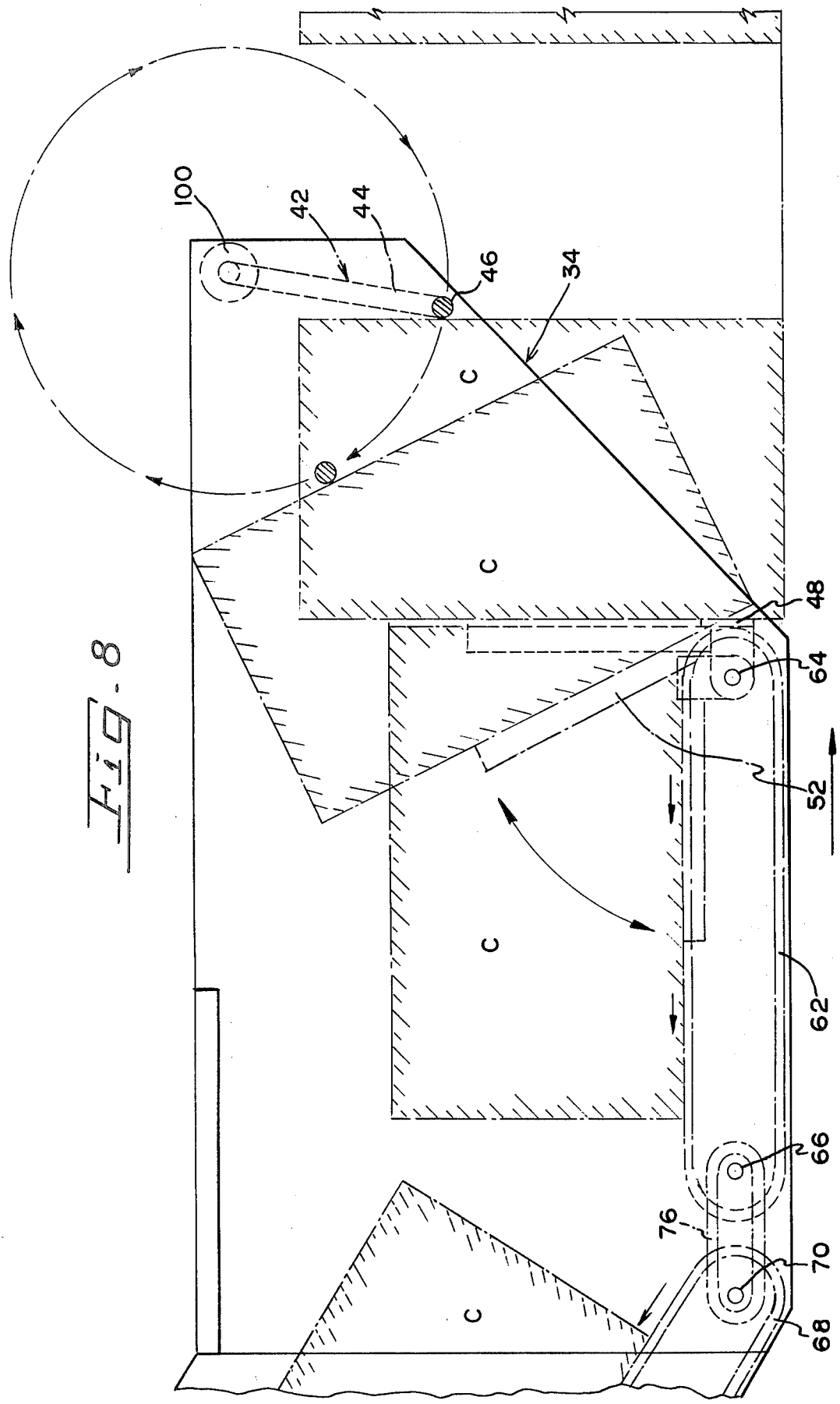

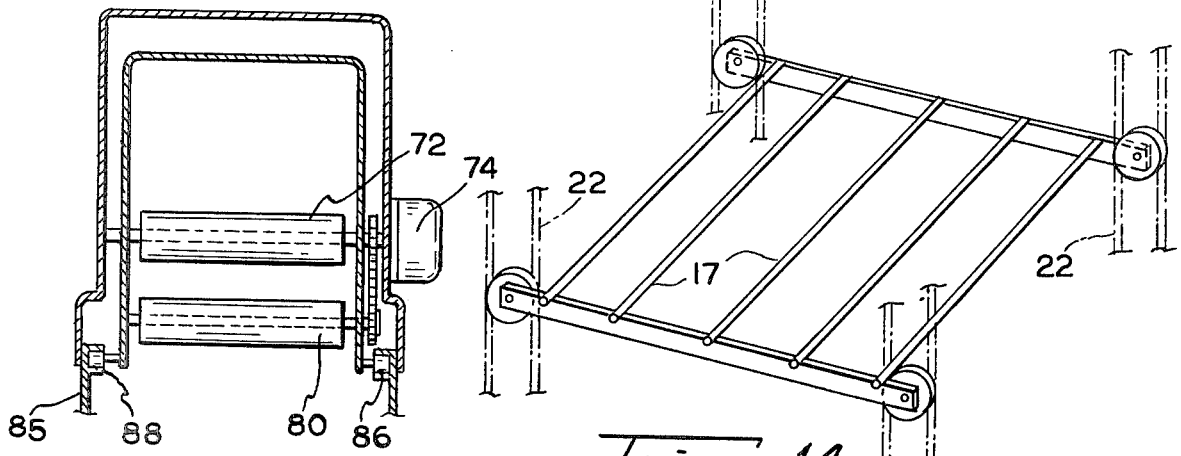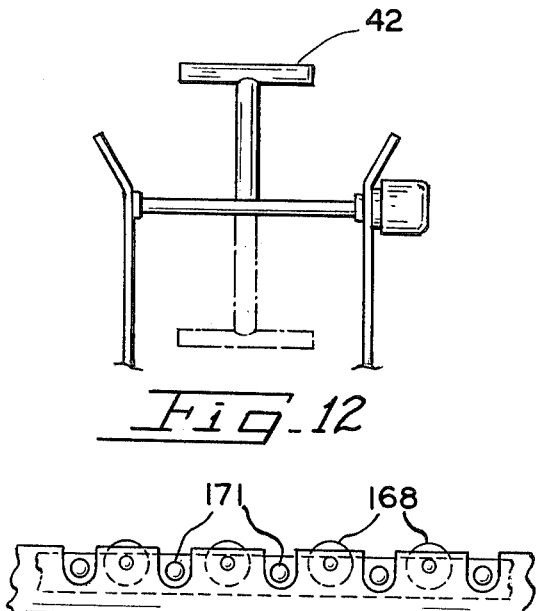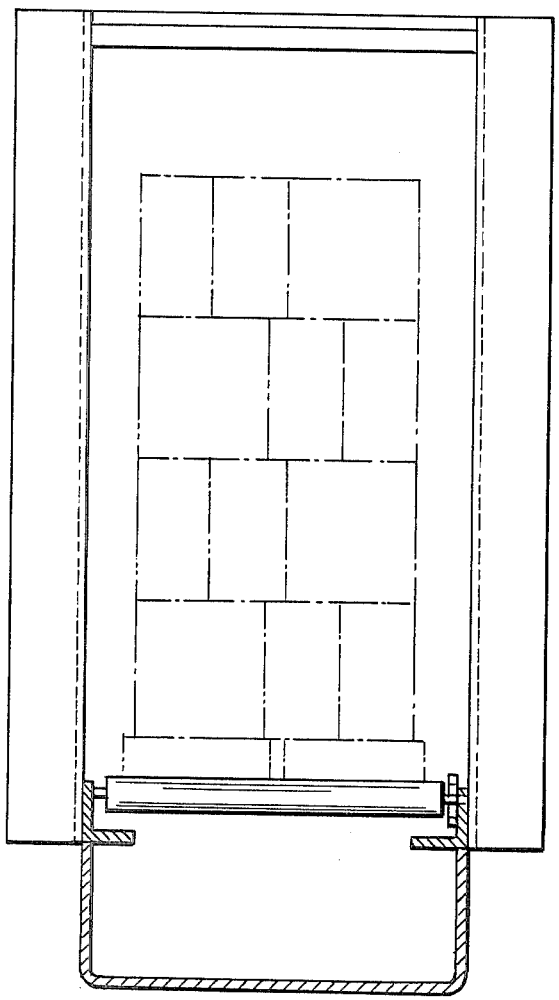

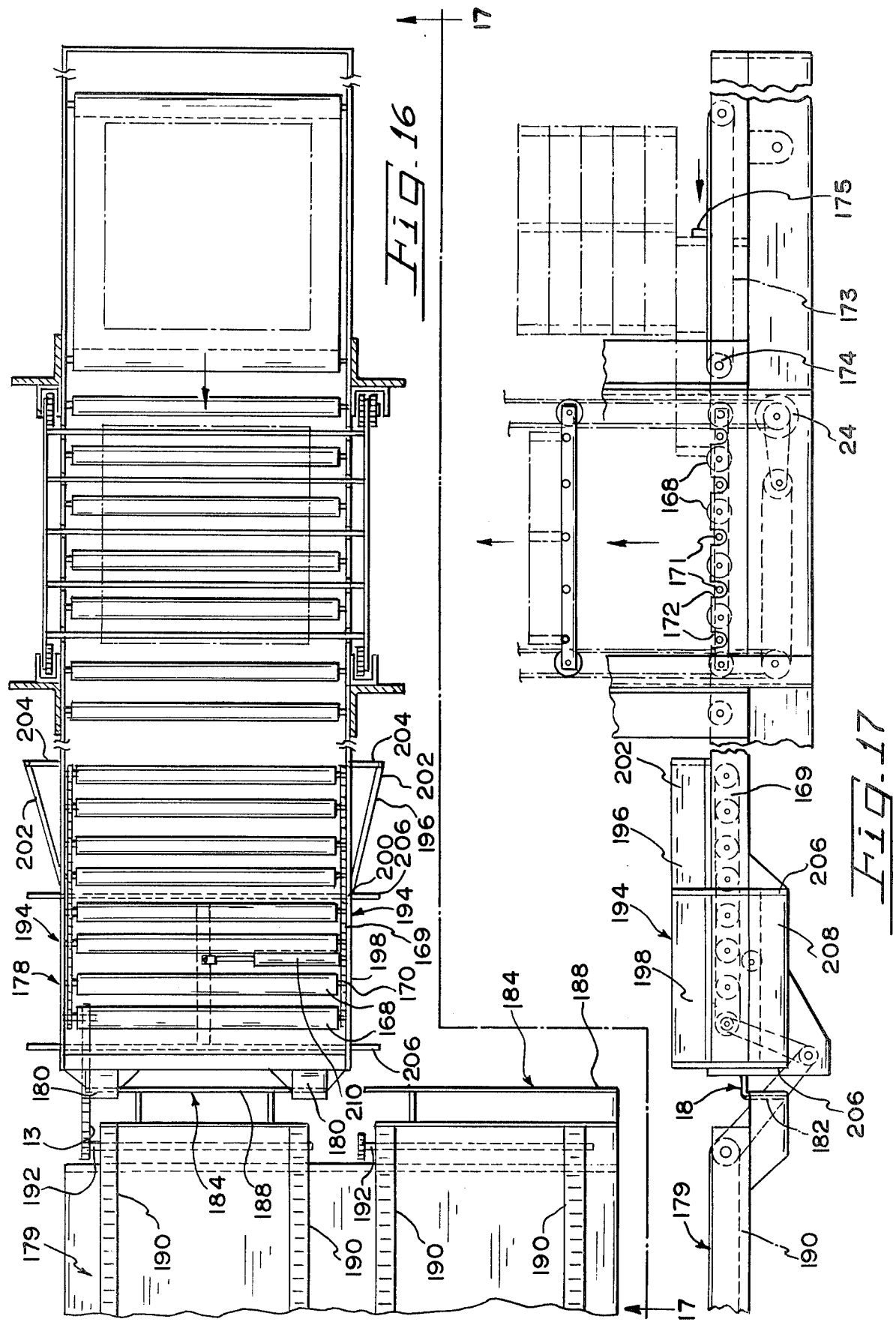

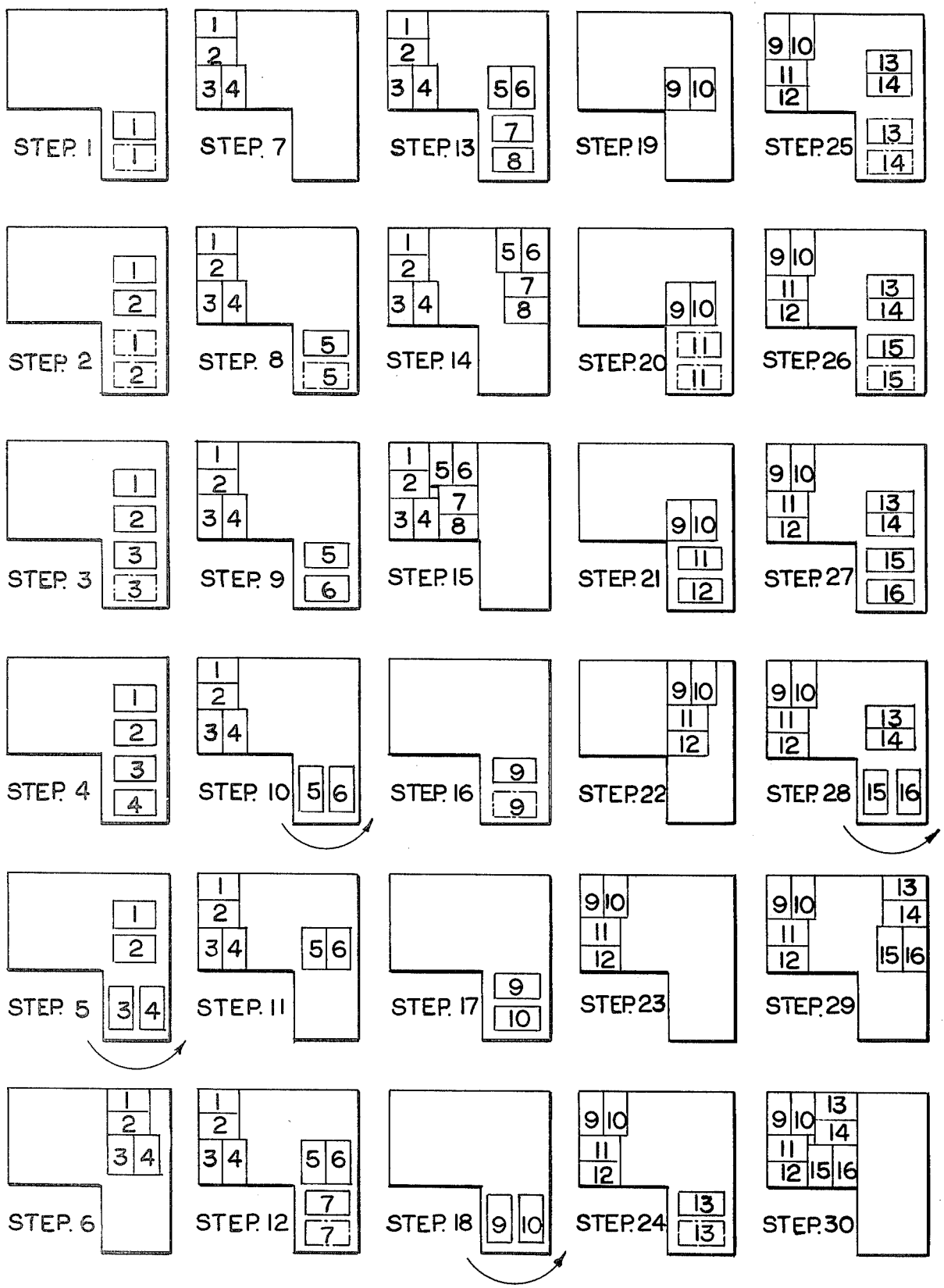

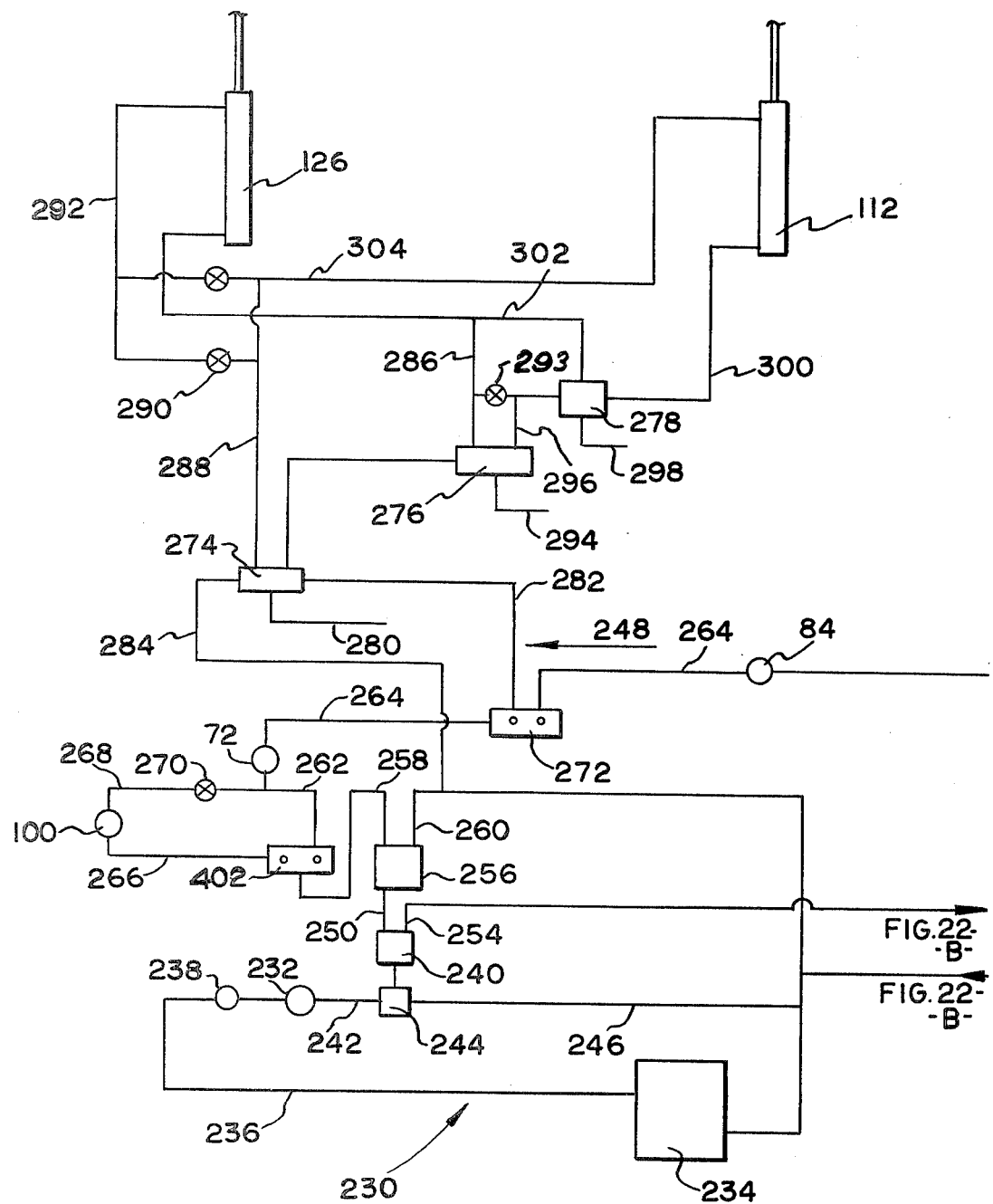
Fig. 22-A

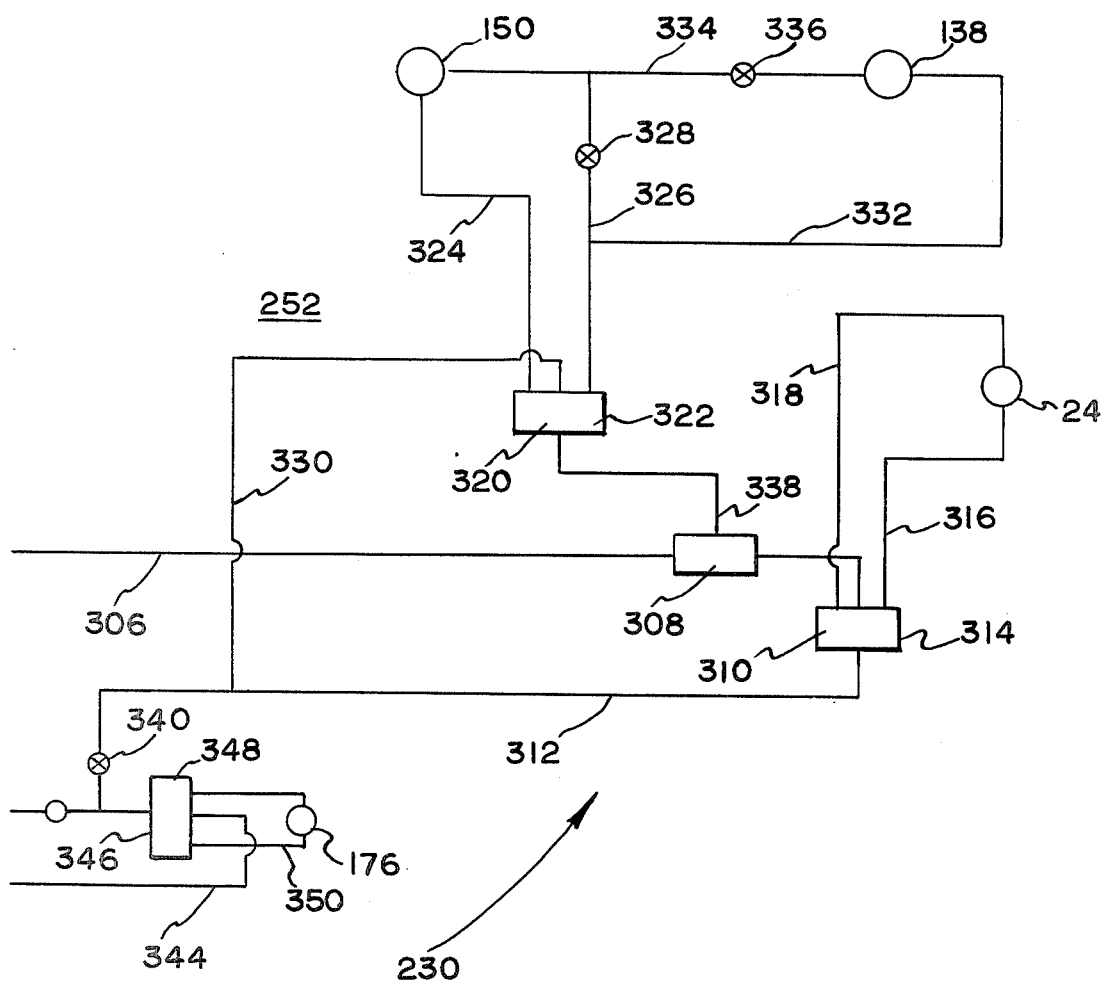
Fig. 22-B

CARTON PALLETIZING DEVICE

BACKGROUND OF INVENTION

This invention relates generally to handling equipment and more particularly to mobile devices for handling produce cartons in the field.

As labor costs in agriculture rise, the need for mechanization continues to increase. In harvesting lettuce according to the most modern and mechanized techniques, the lettuce heads are cut from the plants and placed on a traveling harvester which covers a number of rows. On the harvester, packing hands receive the lettuce heads, wrap them in cellophane and pack them in cardboard cartons. These cardboard cartons are then sealed and dropped off of the harvester, back into the field along one central row space in the middle of the rows being harvested. Trailers are then brought into the field with pallets on them and the cartons are picked up by hand and stacked in cross-tied tiers onto pallets on the trailer. This loading of the cartons from the ground onto a trailer is presently a back breaking chore and the most labor consuming function of an otherwise nearly mechanized operation. It has not been found feasible to palletize the cartons as they are packed on the havesting machine since the loading off of the palletized cartons onto field trailers would slow down the harvesting process. Also, bringing forklift trucks into the field to handle the palletized cartons has been found to be too damaging to the crops and field roads.

What is needed, then, is a machine for picking up the cartons after they have been dropped from the harvester in a space between a group of rows being harvested by the harvester, and to place these cartons onto pallets in tiers that are cross-tied. Such a machine should store enough of the palletized cartons to make transfer loading to a field trailer efficient.

OBJECTS AND ADVANTAGES

It is, therefore, a major object of my invention to provide a mobile carton stacker which picks up cartons from the ground individually and forms them into stacks of cross-tied tiers on a pallet.

Another important object of my invention is to provide an apparatus of the type described in which several loaded pallets can be contained on the mobile apparatus at one time so that the loading of palletized cartons need not be done so frequently as to render the off loading of the machine inefficient.

It is a further object of my invention to provide an apparatus of the type described in which the mobile chassis is so arranged and constructed as to move through field rows without interferring with the plants and without bogging down in the field roads.

It is still another object of my invention to provide an apparatus of the type described which can be operated by a single operator and is relatively easy to maintain.

It is still a further object of my invention to provide an apparatus of the type described which is relatively inexpensive to construct and relatively simple to operate.

These and other objects and advantages of my invention will become more readily apparent from the following detailed description of a preferred embodiment and the accompanying drawings in which:

DRAWINGS

FIG. 1 is a side elevational view of a preferred embodiment of my invention;

FIG. 2 is a plan view, broken longitudinally, of the carton handling and tier forming chambers of my preferred embodiment, taken at 2—2 in FIG. 1;

FIG. 3 is sectional view taken at 3—3 in FIG. 1;

FIG. 4 is a perspective view of a produce carton handled by the preferred embodiment;

FIG. 5 is a plan view of the produce carton of FIG. 4 shown in its at-rest position in the field prior to pickup;

FIG. 6 is a plan view of the forward portion of my preferred embodiment showing its relationship to the crop rows and cartons;

FIG. 7 is a sectional view taken at 7—7 in FIG. 1;

FIG. 8 is an enlarged longitudinal sectional view of the receiving end of the carton receiving mechanism of my preferred embodiment showing the different carton positions in phantom;

FIG. 9 is a sectional view taken at 9—9 in FIG. 1;

FIG. 10 is a sectional view taken at 10—10 in FIG. 1;

FIG. 12 is a sectional view taken at 12—12 in FIG. 1;

FIG. 13 is a sectional view taken at 13—13 in FIG. 1;

FIG. 14 is a perspective view of the stack forming elevator;

FIG. 15 is an enlarged partial side elevational view of the chassis floor below the stack forming elevator taken at location 15 in FIG. 1;

FIG. 16 is a plan view of the chassis bed showing the off loading facility of my preferred embodiment;

FIG. 17 is a sectional view taken at 17—17 in FIG. 16;

FIG. 18 is a schematic layout of the carton assembly steps performed by my preferred embodiment to form a tier of cartons;

FIG. 22 is a schematic view of the control circuitry for my preferred embodiment.

IN THE DRAWINGS

Figures 11, 23:
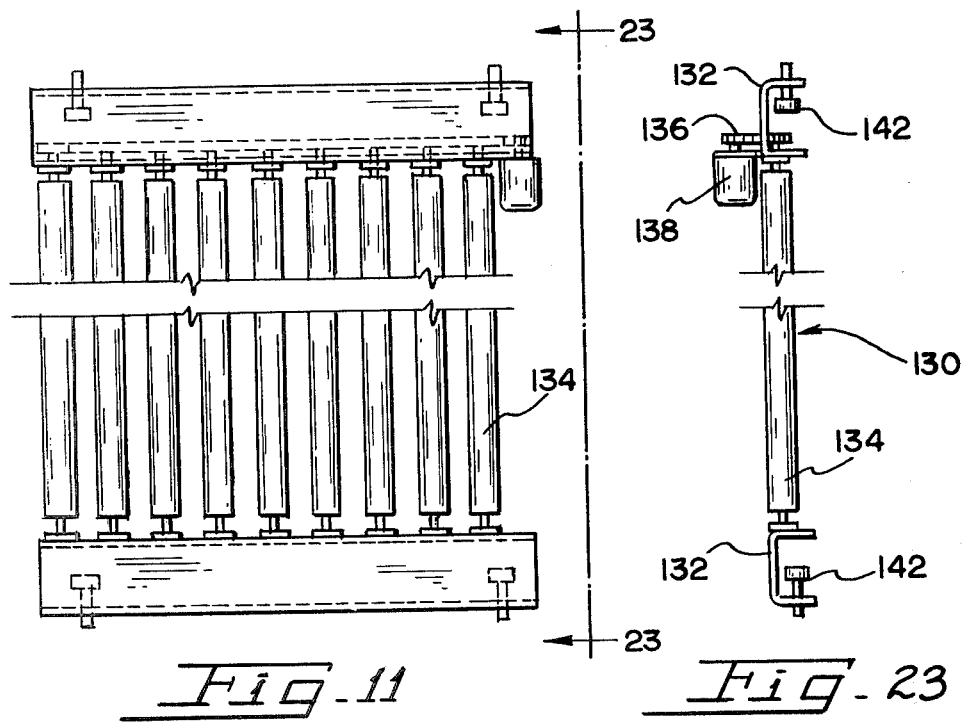
FIG. 11 is a plan view of the transfer carriage of the tier forming transfer compartment, taken at location 11 in FIG. 2.
FIG. 23 is a partial end elevational view of the transfer carriage control circuitry of FIG. 11.

Referring now to the drawings, and particularly to FIGS. 1 through 3 thereof, the numeral 10 designates generally my mobile carton stacker. The carton stacker 10 consists of a chassis 12 with a bed 13, a propelling motor 14, and an operator's cab 15. The chassis 12 is supported by pairs of rubber tired wheels 16 which are driven by the drive motor 14.

At the forward end of the chassis I provide masts 18 which support the corners of a stack elevator 20, and a tier forming deck 19. The stack elevator 20 is moved up and down by elevator drive chains 22 powered by a hydraulic elevator drive motor 24. A pallet storage compartment 26 is disposed forwardly of the stack elevator 20 on the chassis 12, so that a pallet can be drawn from the pallet storage compartment onto the stack elevator and raised to the level of the tier forming deck 19.

The tier forming deck 19 includes a receiving chamber 28 at the right side of the chassis where cartons are received and oriented into proper position to form the components of a tier, and a transfer compartment 30 and stack elevator compartment 31 in the upper portion of the stack elevator shaft, both located behind the cab 15 (see FIG. 2). The receiving chamber 28 is fed by a carton elevator 32 which extends forwardly from the receiving chamber 28 to the ground and has, at its lower end, a carton retrieving mechanism 34.

The carton retrieving mechanism 34 includes a pair of ears 36 which extend forwardly on each side of the carton elevator 32 at its lower end and angle outwardly to form a funnel for directing cartons disposed in the field into the lower end of the mechanism (see FIG. 7).

As best shown in FIGS. 4 and 5, the cartons c have a bottom b, a top t, sides s, and ends e. In the utilization of my apparatus the cartons are left in the field resting on one of their ends e with their bottom b directed to the right with respect to the path of travel of the mobile carbon stacker. They are tipped onto their rearwardly directed side s as they are retrieved by the machine, and are palletized in that position. The tops t and bottoms b of the cartons are stapled closed and, therefore, present uneven surfaces. Thus, by stacking the cartons so that their sides s are the weight bearing surfaces, catching and tearing of the bottom and tops are avoided.

In order to tip the cartons from their end onto their rearwardly facing sides (see FIGS. 8 and 12), as they are retrieved by my machine, my carton retrieving mechanism 34 has a tip crank 42 which is mounted at the forwardmost portion of the retrieving mechanism, above the carton, and rotates a complete revolution whenever it is actuated. The tip crank 42 has arm 44 with a contact bar 46 projecting laterally from its distal end so that as the arms rotate the contact bar strikes the upper part of the carton on its forwardly directed side s and pushes the upper end of the carton upward toward the retriever mechanism, tipping the carton from its end down onto its rearwardly directed side. At the same time, the lowermost portion of the carton is engaged by a contact plate 48 at the bottom of the forwardmost portion of the retrieving mechanism 34. The contact plate has serrations on its surface which grip the carton sufficiently to prevent its tipping laterally toward its top or bottom as it is tipped into the retriever mechanism.

To prevent the carton c from falling too rapidly onto the elevator and thereby possibly damaging the contained produce, a pair of fall retarding arms 52 are provided in the retriever mechanism 34 (see FIGS. 7 and 8). The fall retarding arms 52 are spaced apart slightly less than the width of the carton side s and are pivotally mounted on a shaft in the lower portion of the retriever mechanism 34 at its receiving end. The fall retarding arms 52 are spring loaded into an upright position but are depressable by the weight of a carton against the resistance spring as it falls into the retriever mechanism after tipping by the tip crank 42. The fall retarding arms 52 thereby lower the cartons easily into the retrieving mechanism.

The retrieving mechanism 34 is composed of a receiving section 54, a lower lift section 56 and upper lift section 58. The receiving section 54 is located on the forwardmost portion of the retriever mechanism, is generally horizontal, and has a skid 60 on its bottom which rides in the ground surface. The lower lift section 56 is movable telescopically with respect to the upper lift section 58 to permit adjustment of the position of the receiving section 54 with respect to the ground. This adjustment permits the receiving section 54 to be elevated from the ground when the mobile carton stacker is in transit and lowered into sliding contact with the ground when the receiving section is retrieving cartons.

Each of the sections of the retrieving mechanism 34 has a traveling belt which carries cartons received into the retriever mechanism, up to the receiving chamber 28. The receiving section belt 62 is mounted on a pair of rollers 64 and 66 and moves cartons, as they are tipped onto by the tip crank 42, to the lower lift section 56. The receiving section belt 62 is slightly narrower than the fall retarding arms 52 so that the arms can pass below the belt surface, as they lower a carton into the receiving section, and thereby deposit the carton onto the belt. The lower section belt 68 is mounted on a pair of rollers 70 and 72 and carries cartons from the receiving section to the upper lift section 58. The lower section belt 68 is driven by a hydraulic motor 74 connected to the roller 70. The receiving section belt 62 is driven by the lower section belt by means of a chain and sprocket connection 76 between rollers 72 and 64 (see FIG. 8). The upper section belt 78 is mounted on rollers 80 and 82 and driven by a hydraulic motor 84 connected to the roller 80. The upper section belt 78 carries cartons from the lower lift section to the receiving chamber 28.

To permit telescopic movement of the lower lift section 56 with respect to the upper lift section 58, the upper lift section has a support frame (85) which extends beneath the lower lift section and has tracks 86 upon which track rollers 88 mounted on the lower lift section travel reciprocally (see FIG. 10). The tracks 86 and track rollers 88 are so disposed that the lower section belt 68 overlaps the upper section belt 78 at their junction, so that as cartons on the lower section belt reach the upper limit of the belt they tip off of this belt onto the upper section belt 78. A retriever mechanism adjustment cylinder 90 is provided to move the lower lift section with respect to the upper lift section. The cylinder housing 92 is mounted in the support frame 84 and its arm 94 is connected to the lower lift section.

To retain cartons on the lower lift section 56 and the upper lift section 58 of the retriever mechanism 34 as they are carried upward to the receiving chamber 28, a tunnel housing 96 is provided which encloses each of the sections. The upper lift section portion of the tunnel housing 96 is tapered downwardly at the point of its junction with the lower lift section portion to provide a funnel 98 into which the lower lift section portion of the housing passes. The funnel 98 permits the reciprocal movement between the housing portions on the upper and lower lift sections and provides room for the cartons to tip off of the lower section belt 68 and onto the upper section belt 78. The lower left section portion of the tunnel housing 96 expands in its downward direction to provide room at its lower end for cartons on the receiving section belt 62 to tip slightly upward as they pass onto the lower secton belt 68.

Cartons are, therefore, retrieved by the retriever mechanism 34 by being engaged by the contact plate 48 of the receiving section 54, tipped onto receiving section belt by the tip crank 42 against the retardation of the fall retarding arms 52, and carried to the lower section belt 68. The lower section belt 62 lifts the cartons to the upper secton belt 78 which, in turn, carries them to the receiving chamber 28. The tip crank 42 is driven by a crank motor 100 which is turned on by a contact bar switch 102 mounted adjacent the contact plate 48. After the tip crank has rotated the crank motor is shut off by a cam switch on the tip crank.

When they reach the upper end of the retrieving mechanism 34, cartons are delivered to the receiving chamber 28, one at a time (see FIG. 2). The receiving chamber 28 has a support table 104 on which the cartons come to rest by engaging a stop flange 106 and a guide flange 108. The stop flange 106 and guide flange 108 help properly orient the carton on the support table.

The support table 104 is mounted on a spindle 110 so that it can be rotated 90° by means of a hydraulic table ram 112 connected between the receiving compartment frame and to a crank arm 114 on the support table (see FIG. 3.).

Laterally adjacent the support table 104 and behind the cab 15, is the transfer compartment 30. A lateral pusher 116 is provided in the receiving chamber for reorienting cartons on the support table 104 and transferring them to the transfer compartment 30. As best shown in FIG. 3, the lateral pusher 116 has a horizontally disposed pusher base 118 with an upstanding pusher frame 120 mounted on the right hand lateral edge. The base is mountably mounted in the frame of the receiving compartment 28 by a track and rollers for reciprocal lateral movement with respect to the receiving compartment. A lateral pusher drive cylinder 126 is interconnected between the pusher base 118 and the frame of the receiving compartment 28 to provide power for the reciprocal movement of the lateral pusher. The pusher frame 120 extends up above the support table 104 and is wider than the support table in a fore and aft direction. The pusher frame has a pusher bar 128 on its upper portion which extends fore and aft the full distance of the pusher and is disposed to pass over the guide flange 108 and stop flange 106 and contact cartons resting on the support table. A cut out portion is provided in the pusher frame 120 to permit the support table to pass through the pusher frame without interference when the pusher bar 128 passes over the support table upon reciprocation of the lateral pusher. The lateral pusher drive cylinder 126 has a long stroke and a short stroke, so that cartons on the support table 104 can be pushed either all the way into the transfer compartment 30, by a long stroke, or only to the side of the support table adjacent the transfer compartment, by a short stroke.

The transfer compartment 30 has a transfer bed 130 made up of a transfer bed frame 132 and a plurality of laterally disposed transfer bed rollers 134. The transfer bed rollers 134 are journaled in the bed frame 132 and are interconnected by a chain and sprokets 136 with a roller drive motor 138. The roller drive motor 138 is switched on and off to drive the transfer bed rollers in unison, by means hereinafter described (see FIG. 3).

The transfer bed frame 132 is reciprocally movable fore and aft from the transfer bed compartment 30 into the stack elevator compartment 31 by means of transfer bed tracks 140 and transfer bed wheels 142. The transfer bed frame 132 is connected by pins 144 to a pair of transfer bed drive chains 146 which are mounted on sprockets 148. The drive chains 146 are driven by a transfer bed drive motor 150 through a drive shaft 152 to reciprocally move the transfer bed into the stack elevator compartment 31 and back into the transfer bed compartment 30. At its forward end, the transfer bed has an upstanding transfer pusher frame 153 which engages cartons on the bed as it moves reciprocally to prevent them from sliding off of the bed.

In the stack elevator compartment 31, a squeeze bar 154, a longitudinal guide flange 156, and a lateral guide flange 158 are provided to collect cartons delivered by the transfer bed 130 into a compact tier, as later more fully explained. The squeeze bar 154 has a squeeze plate 160 mounted on a pair of crank arms 162. The crank arms 162 are pivotally mounted in the frame of the elevator compartment 31 and are resiliently urged by springs 164 in a direction which moves the squeeze bar 154 laterally into the elevator compartment. At its forward end the squeeze bar 154 has a flaired end 166 which directs cartons passing into the elevator compartment 31 from the transfer compartment 30 laterally toward the left side of my mobile carton stacker machine. The lateral guide flange 158 is mounted on the left side of the elevator compartment 31 to limit movement of the cartons beyond this border of the compartment, and the longitudinal guide flange 156 is mounted at the rear of the elevator compartment 31 to limit movement of the cartons beyond this border. It will thus be understood that cartons delivered to the elevator compartment 31 can be collected and compacted, laterally between the lateral guide flange 158 and the squeeze bar 154 and longitudinally between the longitudinal guide flange 156 and the transfer pusher frame 153 on the transfer bed 130.

At the bottom of the stack elevator shaft in the bed 13 of my mobile device, and extending rearwardly therefrom for the full remaining length of the bed, are a series of laterally oriented pallet travel rollers 168 (see FIGS. 1, 16 and 17). These pallet travel rollers 168 are rotatably mounted in the frame of the bed 13 and provide the support surface of the bed. A pair of stack drive chains 169 are disposed along the lateral edges of the bed 13 just outboard of the travel rollers 168 and mounted on stack drive sprockets 170. These stack drive chains rotate the travel rollers 168 to move pallets supported on the travel rollers. The stack drive chains extend from the forward portion of the shaft of the stack elevator 20 to the rear of the bed 13 and carry loaded pallets rearwardly from the stack elevator for off loading.

The elevator carriage 171 is a grate of bars disposed to fit into grooves 172 in the bed 13 between the rollers 168 so that the pallets can move over the elevator carriage when it is in the downmost position. The bed 13 forwardly of the stack elevator 20 is a smooth, flat surface to provide a support for the pallet storage compartment 26. The draw empty pallets from the pallet storage compartment 26 into the stack elevator 20 for loading, a pair of pallet drag chains 173 are provided near the lateral edges of the bed forwardly of the stack elevator and mounted on sprockets 174. The pallet drag chains 173 also have cleats 175 which engage the bottom empty pallet in the pallet storage compartment and drag it rearward into the stack elevator 20.

To drive the stack drive chains 169 I provide a stack drive motor 176, which is connected to the rearmost stack drive sprockets 170 by a chain 177, and to drive the pallet drag chains 173 I also utilize the stack drive motor which is also interconnected to the sprockets 174.

At the rear of the bed 13, my mobile carton stacker 10 has means for off-loading loaded pallets to a trailer. Trailers presently used are eight feet wide for highway travel and long enough to hold 10 loaded pallets, five on each side. By relatively simple adaptions it is possible to provide drag chains on these trailers which can drag loaded pallets off of the rear of my mobile carton stacker and back to the rear of the trailer. Since the pallets themselves are about four feet wide, however, and the trailer beds are eight feed wide, the pallets must be accurately located laterally on the trailer to permit two rows of pallets. Since it is difficult to achieve precise alignment between my machine and a trailer, I provide a lateral alignment mechanism 178 at the rear of the bed 13.

To off-load pallets to a trailer 179, I first provide attachment means between my mobile carton stacker and the trailer. As best shown in FIG. 16 and FIG. 17, my attachment means includes a pair of hooks 180 with downwardly projecting lips 182 at their distal ends. The hooks 180 engage a connecting frame 184 on the front of the trailer. Since only half of the trailer is loaded at a time, the trailer has a connecting frame 184 for each half. The connecting frame 184 has a bar 188 which fits under the lips 182 on the hooks 180 and connects the trailer to the chassis 12 of my machine.

The trailer 186 is equipped with drag chains 190 which are driven by a shaft 192. The shaft 192 is connected to the stack drive chains 169 by means of an interconnecting chain and sprockets 193. The trailer drag chains 190 may thus be powered from my machine by either the stack drive motor 176 or a separate auxiliary motor provided for this purpose.

To off-load the loaded pallets from my machine to the trailer 179, it is necessary only to drive the rearmost pallet off the rear of my bed 13 and onto the forward portion of the trailer by use of the stack drive chains 169, and to drag the pallet rearward on the trailer by use of the trailer drag chains 190. In order to properly position the pallets on the trailer, it is necessary, however, that the lateral alignment of the pallets be precise when they are dragged onto the trailer bed. I achieve this with my lateral alignment mechanism 178 which consists primarily of a pair of laterally movable pallet guides 194. The pallet guides 194 have forward portions 196 and rearward portions 198 which are connected by hinges 200. The distal ends 202 of the forward portions 196 are pivotally mounted on bracket 204 connected to the chassis 12. The rearward portions 198 are carried by a pair of C-shaped members 206 which are mounted in an alignment frame 208. The alignment frame 208 is mounted on the chassis 12 and disposed beneath the bed 13 for reciprocal lateral movement with respect to the bed. A lateral alignment mechanism drive cylinder 210 is connected between the chassis 12 and the alignment frame 208 and is hydraulically powered to laterally reciprocate the alignment frame with respect to the bed. By driving the alignment frame 208 laterally to the left side, as shown in FIG. 18, the pallet guides 194 are shifted laterally so that the pallet guide on the right side extends inwardly over the bed 13 while the pallet guide on the left side is spaced laterally outwardly from the left side of the bed. Pallets positioned on or being moved onto the rearmost portion of the bed 13 are, therefore, caused to shift laterally to the left. By driving the alignment frame 208 to the right, a similar shifting of pallets to the right side of the bed 13 is achieved. Therefore, pallets being off-loaded from the rear of my machine onto a trailer can be shifted laterally to the left or right to achieve proper alignment with the trailer bed. Height adjustment is achieved by a bed pivot ram 207 which raises and lowers the tail of the bed about a bed pivot 209.

OPERATION

Having described the structure of my mobile carton stacker 10, I will now describe its operation.

To propel my machine to a work site, I raise the lower lift section 56 of the retrieving mechanism 34 to position the receiving section 54 out of contact with the ground by retracting the retriever mechanism adjustment cylinder 90 and drive it to the site. At the work site I align the mobile chassis 12 so that the wheels 16 will pass between the rows of plants and the retrieving mechanism 34 is aligned with a row of cartons (see FIG. 6). I then lower the lower lift section 56 of the retrieving mechanism 34 with the cylinder 90 until the receiving section 54 is sliding on its skid 60, and then set the mobile carton stacker into forward motion on the ground surface while guiding it so as to direct the cartons into the receiving section. As each carton is engaged by the foremost portion of the receiving section 54, its upper portion will be funneled into the receiving section by the ears 36 and the lower portion will be engaged by the contact plate 48 and steadied and urged rearwardly by its serrated surface. At the same time, the contact bar switch 102 will be actuated and will activate the tip crank motor 100 and start the tip crank 42 rotating. The contact bar 46 on the tip crank arm 44 will engage the forwardly directed side s of the carton, above the center of gravity and tip the upper part of the carton rearwardly into the receiving section.

As the carton tips into the receiving section 34, it will engage the fall retarding arms 52 and be lowered gently onto the receiving section belt 62. From the receiving section belt, the carton will be transferred to the lower section belt 68, and from there to the upper section belt 78 and into the receiving chamber 28. Each further carton engaging the retriever mechanism will be delivered in order to the receiving chamber in a like manner.

To simplify the explanation of the operation of my tier forming deck 19, reference will be made to the schematic representations in FIG. 18. Before a tier is formed, however, a pallet must be positioned in the bottom of the elevator compartment 31 by the stack elevator 20. This is achieved by first activating the pallet drag chains 173 to drag the bottom pallet in the pallet storage compartment 26 forward into the bottom of the stack elevator shaft, with the elevator at its lowest position where the grate bars of the carriage 171 are in the grooves 172 between the travel rollers 168. The stack elevator is then raised to carry the pallet into the bottom of the elevator compartment 31 where it is retained while it is loaded.

Five tiers of cartons are then formed and stacked in sequence on the pallet as follows. As carton 1 is received in the receiving chamber 28 it slides rearward on the support table 104 until it strikes the stop flange 106. A sequencing switch 214 is disposed adjacent the stop flange 106 and is actuated by contact with the carton. The sequencing switch 214 is connected into sequencing circuitry hereafter more fully described, which activates the lateral pusher 116 on a short stroke to slide carton 1 laterally to the left on the support table, as shown in step one of FIG. 18. When carton 2 is delivered to the receiving chamber 28 it actuates the sequencing switch 214 in a like manner, and the sequencing circuitry activates the lateral pusher 116 again, but this time on a long stroke to slide carton 2 into carton 1 and both cartons laterally to the left off of the support table 104 and onto the transfer bed 130 in the transfer compartment 30 (see step 2, FIG. 18).

Carton 3 is then delivered to the receiving chamber and actuates the sequencing switch 214. The sequencing circuitry again activates the lateral pusher 116, on a short stroke pushing carton 3 to the left side of the support table (see step 3, FIG. 18).

When carton 4 arrives in the receiving chamber 28 and actuates the sequencing switch 214, the sequencing circuitry activates the hydraulic table ram 112 which rotates the support table 164 ninety degrees counterclockwise (as seen in the plan view of FIG. 2). When the support table 104 reaches the limit of its rotation it actuates a rotating limit switch 216 which, through the sequencing circuitry, activates the lateral pusher 116 again, on a long stroke, pushing cartons 3 and 4, which are now positioned laterally with respect to the chassis 12 into the transfer compartment 30 where they engage cartons 1 and 2 and slide them to the left side border of the compartment (see steps 4 and 5, FIG. 18). As the lateral pusher 116 retracts, the sequencing circuitry retracts the table ram 112, rotating the support table back to its original position.

When the cartons in the transfer compartment 30 strike the left hand border of the compartment, they actuate a transfer bed travel switch 218. The transfer bed travel switch 218, through the sequencing circuitry activates the trasfer bed drive motor 150 which through the transfer bed drive chain 146 moves the transfer bed into the elevator compartment 31. At the rearmost edge of the elevator transfer compartment 31, adjacent the longitudinal guide flange 156, is a transfer bed limit switch 220. The transfer bed actuates the transfer bed limit switch 220 when it reaches the rearward limit of it travel. Through the sequencing circuitry, the transfer bed limit switch 220 reverses the transfer bed drive motor 150, causing the transfer bed to travel back to the travel compartment 30, and at the same time activates the roller drive motor 138 to rotate the transfer bed rollers 134. The speed of the roller drive motor 138 is such that the rollers 134 move the cartons rearwardly on the transfer bed faster than the transfer bed moves forwardly, thereby depositing the cartons onto the pallet and forcing them against the longitudinal guide flange 156 and compacting their assembly longitudinally. At the same time the assembly of cartons is subjected to force from the squeeze bar 154 in a lateral direction to the left against the lateral guide flange 158, thereby compacting the assembly laterally, as well (see steps 6 and 7, FIG. 18).

When the transfer bed returns to its forwardmost position in the transfer compartment 30 it engages and actuates a transfer bed deactivating switch 222, which through the sequencing circuitry shuts off the transfer bed drive motor 150.

At this point, one-half a tier has been formed and placed on the rearward portion of the pallet and compacted. It should be understood that dimensions of the cartons may not provide an even junction edge along the forward face of the one-half tier that is formed. Lettuce cartons are generally twelve inches deep and twenty one inches long. Therefore, the fore and aft dimensions of the one-half tier formed will be twenty-four inches on the right hand side where cartons 3 and 4 are disposed laterally side by side, and only twenty-one inches on the left hand side where cartons 1 and 2 are longitudinally directed. An offset is thus formed on the forward face of the one-half tier, however, the second one-half of the tier is formed opposite to the first to mate with the offset, as will hereafter be explained.

When carton 5 arrives in the receiving chamber 28 and actuates the sequencing switch 214, the sequencing circuitry activates the lateral pusher 116 on a short stroke pushing carton 5 to the left hand side of the support table 104 (see step 8, FIG. 18).

When carton 6, upon its arrival, actuates the sequencing switch 214, the sequencing circuitry activates the table ram 112 rotating the support table. The support table 104 actuates the support table limit switch 216 when it reaches its rotation limit, prompting the sequencing circuitry to activate the lateral pusher 116 on a long stroke, and pushing cartons 5 and 6 into the transfer compartment 30 (see steps 9-11, FIG. 18).

Carton 7 then arrives in the receiving chamber 28, and the sequencing circuitry upon actuation of the sequencing switch 214, activates the lateral pusher 116 on a short stroke, leaving the carton on the left side of the support table (see step 12, FIG. 18).

Carton 8 is similarly treated except that the lateral pusher 116 is activated on a long stroke pushing cartons 7 and 8 into the transfer compartment 30 and driving cartons 5 and 6 to the lefthand border of the compartment (see step 14, FIG. 18). When cartons 5 and 6 strike the lefthand border of the transfer chamber 30 they actuate the transfer bed travel switch 218 again. The transfer bed 130 then carries the newly formed second one-half tier rearward into the elevator compartment 31 (see step 15, FIG. 18).

The transfer bed 130 will reverse itself and start up the rollers 134 in the same manner as before when the cartons actuate the transfer bed limit switch 220, thereby jumping the second one-half tier assembly on the forward portion of the pallet and compacting the two half tiers into a full tier. The leftmost cartons 5 and 6 of the second half tier are laterally disposed side by side and thus have a twenty-four inch fore and aft dimension, while the cartons 7 and 8 are longitudinally disposed and have only a twenty-four inch fore and aft dimension, while the cartons 7 and 8 are longitudinally disposed and have only a twenty-one inch fore and aft dimension. Since the lateral cartons 5 and 6 are positioned adjacent the longitudinal cartons 1 and 2 of the first half tier and the longitudinal cartons 7 and 8 are positioned adjacent the lateral cartons 3 and 4 of the first half tier, the outside dimensions of the completed tier, laterally and longitudinally, are even and the offsets are accommodated in the center of the tier (see step 15, FIG. 18).

When the transfer bed 130 returns to its forwardmost position in the transfer compartment 30 it again actuates the transfer bed deactivating switch 222. The sequencing circuitry upon receipt of the second shutdown signal from the transfer bed, shuts off the drive motor 150, and also activates the stack elevator motor 24 to lower the elevator a distance of one tier height. Since the cartons, being placed on the pallet on their sides, have a height of eighteen inches, this is the distance for which the sequencing circuitry is programmed. This distance can be determined by timing the period of operation of the stack elevator drive motor, or by spacing contact switches in the stack elevator shaft at the desired shutoff points.

Having lowered the stack elevator, one tier, the tier forming deck 19 is prepared for the formation of the second tier. To achieve an interlocking or cross-ties in the carton stack, the second tier is formed in a reverse manner to the first tier. That is, the first half of the second tier is formed like the second half of the first tier, and the second half of the second tier like the first half of the first tier. Thus, cartons 9 and 10 will be rotated by the support table 104 before they are transferred to the transfer compartment 30 and when disposed on the first tier in the elevator compartment 31 will rest on top of cartons 1 and 2 but will be laterally rather than longitudinally disposed.

Accordingly, cartons 11 and 12 will be rested on top of cartons 3 and 4 but will be longitudinally disposed, cartons 13 and 14 will be longitudinally disposed on top of laterally disposed cartons 5 and 6, and finally, cartons 15 and 16 will be laterally disposed on top of longitudinally disposed cartons 7 and 8 (see steps 16–30, FIG. 18). Again, the outside dimensions of the second tier will be even and commensurate with those of the first tier, and the center space accommodating the offsets will be commensurate with that in the first tier. The related pairs of cartons forming each tier will be oppositely disposed, however, to cross-tie the cartons and keep them from falling out of the stack.

Figure 19:
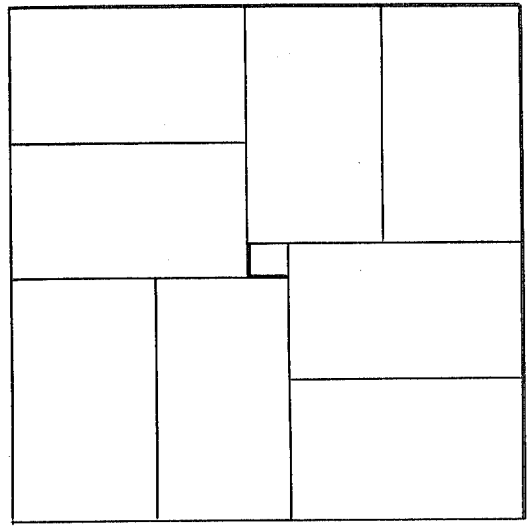
FIG. 19 is a plan view of a first form of tier.
Figure 20:
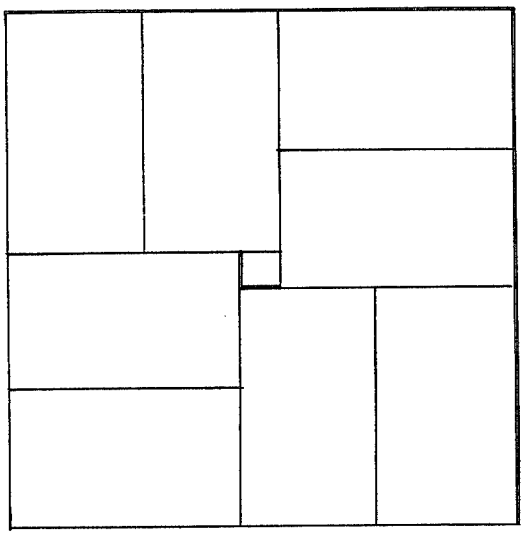
FIG. 20 is a plan view of a second form of tier.
Figure 21:
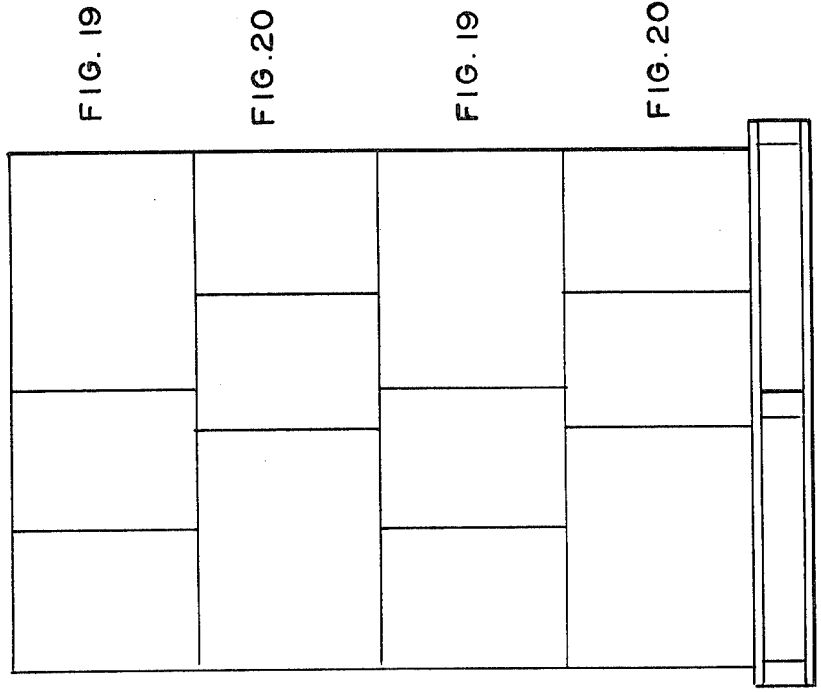
FIG. 21 is a side elevation view of a palletized stack of cartons.

The third tier will be formed like the first again, and the fourth like the second. Therefore, tiers one and three will be the same, and tiers two and four will be reversed. The resultant cross-tied stack of palletized cartons are shown in FIGS. 19, 20 and 21.

POWER SYSTEM

In FIGS. 22a and 22b, I show a schematic diagram of the power hydraulic system which operates my mobile carton stacker 10. The power system 230 is supplied by a main hydraulic pump 232 which is driven off the motor 14. The main pump 232 draws hydraulic fluid from a hydraulic fluid reservoir tank 234 via feed line 236 and a hydraulic fluid filter 238, and delivers its output to a system selector valve 240 via output line 242 and a system relief valve 244. The system relief valve 244 relieves system overload by redirecting overload fluid back to the reservoir tank 234 via relief line 246, in a manner well known in the art.

The system selector 240 controls the delivery of hydraulic power, principally to two sub-systems, the cartons retrieving and assembly sub-system 248 (shown in FIG. 22a) bed by sub-system feed line 250, and the tier and stack forming sub-system, by feed line 306. For simplicity, I will first describe the carton retrieving and assembly sub-system 248 by reference to FIG. 22a. A reservoir return line 254 by-passes fluid during stand-by.

The sub-system feed line 250 which feeds the carton retrieving and assembly sub-circuit 248 first delivers fluid to a flow control device 256 which feeds a regulated hydraulic flow to the sub-system via flow line 258 and returns extra fluid to the fluid reservoir tank 234 via flow return line 260 in a manner well known in the art. The flow line 258 delivers hydraulic fluid to the lower section drive motor 72 of the retriever mechanism 32 which operates the lower section belt 68 and the receiving section belt 62, via conduit 262, and to the upper section drive motor 84 which operates the upper section belt 78, via conduit 264. The flow line 258 also feeds the drive motor 100 of the tip crank 42 via crank operating valve 402 and motor feed conduit 266 which returns to conduit 262 via return conduit 268 and check valve 270.

A carton arranger power beyond valve 272 is connected in conduit 264 before the upper section drive motor 84 and feeds the lateral pusher drive cylinder 126 and support table rotating ram 112 through a carton arranger power valve 274, a selector valve 276 and a sequence valve 278. The carton arranger power valve 274 is controlled by the sequencing circuitry through control line 280, is fed hydraulic fluid by conduit 282, and returns fluid via conduit 284. When the carton arranger power valve 274 is activated, the carton arranger power beyond valve 272 redirects the fluid in conduit 264 from the upper section drive motor 84 to the lateral pusher drive cylinder 126 or the support table rotating ram 112, causing the upper section drive motor to stop feeding cartons to the receiving chamber 28.

In one position the carton arranger power valve 274 feeds the lateral pusher drive cylinder 126 via selector valve 276 on feed line 286 to extend the cylinder ram. When the appropriate limit switch for the desired stroke (i.e. short stroke or long stroke) signals the sequencing circuitry, the power valve 274 changes to a second position and retracts the cylinder ram via feed line 288 check valve 290, and cylinder line 292. Check valve 293 provides a relief path on retracting of the table ram so its initial positioning is accurately achieved. When the sequency circuitry signals activation of the support table rotating ram 112 on channel 294 for rotation of the support table, it signals the selector valve 276 and changes its output from conduit 286 to conduit 296 which passes through the selector valve 278 to the rotating ram on ram feed line 300. When the table is rotated ninety degrees it strikes the rotate limit switch 216 and the sequencing circuitry signals the sequence valve 278 on channel 298 to switch to cylinder feed line 302, and extend the lateral pusher drive cylinder 126. When the lateral pusher drive cylinder trips the long stroke limit switch, the sequencing circuitry switches the carton arranger power valve 274 to conduit 288 and simultaneously retracts both the lateral pusher drive cylinder (via feedline 292 and the rotating ram 112) via feed line 304.

In this manner, the previously described collection and arrangement of cartons is carried on in the receiving compartment 28, and no cartons are delivered to the receiving compartment while the lateral pusher or support table are in operation because the carton arranger power beyond valve 272 redirects fluid from the upper section drive motor 84 to the carton arranger power valve 274.

Hydraulic fluid from the upper section drive motor 84 passes to the tier and stack forming sub-system 252 on feedline 306, through a tier arranger power beyond valve 308, a stack elevator power valve 310 and into reservoir return line 312.

The stack elevator power valve 310 by-passes the fluid until it receives a signal from the sequencing circuitry on channel 314. If the signal calls for upward movement, fluid it fed to the stack elevator drive motor 24 via motor feed line 316 and if it calls for downward movement it is fed to the stack elevator drive motor via motor feedline 318. In either case, the drive motor is shut down by position limit switches on the elevator path which signal the sequency circuitry.

When transfer of one half a tier from the transfer compartment 30 to the stack elevator compartment 31 is called for, the sequencing circuitry activates a transfer bed power valve 320 by a signal on channel 322. The transfer bed power valve 320 delivers fluid to the transfer bed drive motor 150 via motor forward feed line 324, and check valve 328. The fluid returns via motor forward return line 326 and is by-passed by the power valve 320 to a reservoir return line 330.

When the transfer bed 130 reaches its appropriate travel distance (i.e. short travel or long travel) the sequencing circuitry responds to limit switch signals and reverses the transfer bed power valve 320 to feed the fluid, first to the roller drive motor 138 via motor feed line 332 to activate the transfer bed rollers 134 and unload the half tier, and then to the transfer bed drive motor 150 via connecting conduit 334 and a check valve 336. Fluid feed to the transfer bed drive motor 150 from connecting conduit 334 drives the motor in a reverse direction and returns to transfer bed to the transfer compartment. The fluid returns via line 324 and is again by-passed by the transfer bed power valve 320 to reservoir return line 330.

By means of the tier arranger power beyond valve 308, whenever the transfer bed power valve 320 is activated, the fluid in feed line 306 is diverted to the power valve via conduit 338, and the stack elevator can not, therefore, be lowered during movement of the transfer bed 130.

The fluid delivered to reservoir return lines 312 and 330 pass back to the reservoir return line 260 via check valve 340, stack drive motor power valve 342, and connector line 344. When the stack drive motor power valve 342 is activated by a sequencing circuitry signal on channel 346, fluid is fed to the stack drive motor 176 via veed line 348 and returns via line 350. If reverse operation of the stack drive motor 176 is called for by the sequencing circuitry the stack drive motor power valve 342 feed fluid to the motor in the opposite direction.

The sequencing circuitry referred to in this disclosure is not made part of this invention. It will be readily understood however, by those skilled in the art that numerous known methods of providing the function attributed to this circuitry exist. I prefer transistorized electronic circuitry for the purpose, however electromagnetic, and even pneumatic, elements exist which can be interconnected to provide the desired result.

Having described the various components of my preferred embodiments and their interconnection and operation, it should be understood that my invention is fully capable of achieving the objects and providing the advantages heretofor attributed to it.

I claim:

1. A mobile carton handling device for retrieving produce cartons from the field and palletizing said cartons in stacks comprising:
   a mobile chassis;
   an elongated bed mounted on said chassis having a stack forming end and an off-loading end;
   a pallet storage compartment on said bed at the stack forming end thereof disposed to store a plurality of pallets;
   a tier forming deck mounted on said chassis above the stack forming end of said bed;
   pallet elevator means on said chassis adjacent the stack forming end of said bed and disposed to receive pallets from said pallet sotrage compartment and raise pallets to and lower pallets from said tier forming deck;
   a stack forming compartment on said tier forming deck disposed above said pallet elevator;
   a tier forming compartment on said tier forming deck adjacent to and interconnected with said stack forming compartment;
   a carton grouping compartment on said tier forming deck adjacent to and interconnected with said tier forming compartment;
   carton retrieving means on said chassis for engaging cartons resting in the field and delivering them to said carton grouping compartment;
   carton arranging means in said carton grouping compartment for arranging said cartons into groups and transfering said carton groups to said tier forming compartment, said carton arranging means includes a support floor for receiving and supporting cartons delivered from said carton retrieving means, lateral pusher means for moving cartons on said support floor transversely to their path of travel into said carton grouping compartment, and carton rotating means for rotating cartons on said support floor ninety degrees to said path of said cartons upon entry to said carton grouping compartment, said support floor being a spindle mounted table, said lateral pusher means being a carriage disposed to reciprocate laterally with respect to said chassis and has a carton engaging pusher frame which engages cartons on said table during said reciprocal movement, and said carton rotating means being a power driven crank arm attached to said table which rotates said table ninety degrees and returns it to its original position;
   tier forming means in said tier forming compartment for receiving carton groups from said carton grouping compartment, and delivering said groups to said stack forming compartment to form tiers therefrom;
   pallet transfer means interconnected with said bed for transfering empty pallets from said pallet storage compartment to said pallet elevator means, and for transfering load pallets from said pallet elevator means to said off-loading end of said bed; and
   power means for sequencially operating carton retrieving means, said carton arranging means, said tier forming means, said pallet elevator means and said pallet transfer means.

2. A mobile carton handling device as described in claim 1, in which:
   said carton retrieving means includes carton conveyor disposed between said carton grouping compartment and ground level and having a receiving end at ground level with a throat to engage and receive cartons resting on the ground and a tip crank which engages said cartons and tips them onto said conveyor.

3. A mobile carton handling device as described in claim 2, in which:
   said carton conveyor includes an upper section interconnected with said carton grouping compartment and a lower section interconnected with said receiving end, said lower section being telescopically movable with respect to said upper end to adjust the position of said receiving end with respect to the ground.

4. A mobile carton handling device as described in claim 1, in which:
   said tier forming means includes a movable bed which reciprocates longitudinally from said tier forming compartment into said stack forming compartment and back again, and carton unloading means on said bed for unloading cartons from said bed, said carton unloading means includes a plurality of rollers rotatably mounted in said bed and roller drive means on said bed for operating said rollers to move cartons on said bed in a direction opposite to the direction of travel of said bed when said bed moves from said stack forming compartment back to said tier forming compartment.

5. A mobile carton handling device as described in claim 1, in which:
said pallet elevator means is operable to lower said pallet from said tier forming deck in steps, each being substantially the height of a tier of cartons, by said power means whereby a stack of carton tiers is formed on said pallet as said pallet elevator is lowered by steps from said tier forming deck.

6. A mobile carton handling device as described in claim 1, in which:
said pallet transfer means includes a plurality of rollers rotatably mounted in said bed and roller drive means driven by said power means to rotate said rollers and carry pallets thereon from the bottom of said pallet elevator means to said off-loading end of said bed, and said pallet transfer means further includes pallet drag chains mounted in said bed and operable by said power means to engage and drag empty pallets from said pallet storage compartment to the bottom of said pallet elevator means.

7. A mobile carton handling device as described in claim 1, in which:
said power means includes a hydraulic pump and reservoir, hydraulic drive units, hydraulic valves and hydraulic conduits all interconnected to sequentially operate said carton retrieving grouping, tier forming and elevator means.

8. A mobile carton handling device as described in claim 1, in which:
said carton retrieving means includes carton conveyor disposed between said carton grouping compartment and ground level and having a receiving end at ground level with a throat to engage and receive cartons resting on the ground and a tip crank which engages said cartons and tips them onto said conveyor;
said carton arranging means includes a support floor for receiving and supporting cartons delivered from said carton retrieving means, lateral pusher means for moving cartons on said support floor transversely to their path of travel into said carton grouping compartment, and carton rotating means for rotating cartons on said support floor ninety degrees to said path of said cartons upon entry to said carton grouping compartment; and
said tier forming means includes a movable bed which reciprocates longitudinally from said tier forming compartment into said stack forming compartment and back again, and carton unloading means on said bed for unloading cartons from said bed.

9. A mobile carton handling device as described in claim 8, in which:
said pallet transfer means further includes pallet drag chains mounted in said bed and operable by said power means to engage and drag empty pallets from said pallet storage compartment to the bottom of said pallet elevator means, and lateral pallet adjustment means on the off-loading end of said bed for laterally aligning pallets with respect to said chassis during off-loading.

10. In a chassis mounted carton handling machine, a carton arranging mechanism mounted on said chassis and disposed to receive cartons individually and arrange said cartons into groups, comprising;
a support table spindle mounted on said chassis and rotatable with respect thereto;
means on said chassis operatively associated with said support table defining a carton entry side and a carton exit side, said carton exit side being disposed at a right angle to said carton entry side;
a pusher carriage mounted on said chassis and disposed to reciprocate across said support table above its upper surface in the direction of said carton exit defining means and back again;
support table rotating means disposed upon actuation to rotate said support table from an initial position through ninety degrees to a turn position and back again; and
entry stop means on a side of said support table opposite said carton entry defining means when said support table is in said initial position which are disposed to engage and limit the movement of cartons upon said support table, and exit stop means on a side of said support table opposite said carton exit defining means when said support table is in said initial position which are disposed to engage and limit the movement of cartons upon said support table.

11. A carton arranging mechanism as described in claim 10, in which
said pusher carriage is disposed to reciprocate across said support table above said stop flanges and has a long stroke whereby said carriage travels completely across said support table and returns, and a short stroke whereby said pusher carriage travels substantially half way across said support table and returns.

* * * * *

UNITED STATES PATENT AND TRADEMARK OFFICE
CERTIFICATE OF CORRECTION

PATENT NO. : 4,247,239

DATED : January 27, 1981

INVENTOR(S) : Marvin E. Miguel

It is certified that error appears in the above-identified patent and that said Letters Patent are hereby corrected as shown below:

Column 3, line 21, delete "carbon" and insert ---carton---.

Column 6, line 48, delete "The" in the first instance and insert ---To---.

Column 7, line 42, delete "bracket" and insert ---brackets---.

Column 9, line 34, delete "it" in the second instance and insert ---its---;

line 38, delete "travel" and insert ---transfer---.

Column 10, line 34, delete "jumping" and insert ---dumping---;

line 40, delete in toto; and line 41, delete in toto.

Column 11, line 45, delete "bed" and insert---fed---.

Column 12, line 56, delete "it" and insert ---is---.

Column 13, line 29, delete "veed" and insert ---feed---;

line 61, delete "sotrage" and insert ---storage---.

Signed and Sealed this

Twenty-first Day of July 1981

[SEAL]

Attest:

GERALD J. MOSSINGHOFF

Attesting Officer     Commissioner of Patents and Trademarks